United States Patent
Naskali (10) Patent No.: US 9,685,808 B2
(45) Date of Patent: Jun. 20, 2017

(54) USB ENERGY HARVESTING

(71) Applicant: Nokia Corporation, Espoo (FI)

(72) Inventor: Matti Juhani Naskali, Tokyo (JP)

(73) Assignee: Nokia Technologies Oy, Espoo (FI)

( * ) Notice: Subject to any disclaimer, the term of this patent is extended or adjusted under 35 U.S.C. 154(b) by 518 days.

(21) Appl. No.: 14/301,241

(22) Filed: Jun. 10, 2014

(65) Prior Publication Data

US 2015/0357835 A1 Dec. 10, 2015

(51) Int. Cl.
*H02J 7/00* (2006.01)
*H02J 7/34* (2006.01)
*H02J 7/35* (2006.01)

(52) U.S. Cl.
CPC ............ *H02J 7/007* (2013.01); *H02J 7/0052* (2013.01); *H02J 7/34* (2013.01); *H02J 7/35* (2013.01); *H02J 2007/0062* (2013.01); *Y10T 307/344* (2015.04)

(58) Field of Classification Search
CPC .. H02J 7/007; H02J 7/0052; H02J 2007/0062; H02J 7/35; Y10T 307/344
See application file for complete search history.

(56) References Cited

U.S. PATENT DOCUMENTS

| | | | |
|---|---|---|---|
| 9,018,896 B2* | 4/2015 | Fischbach | H02J 7/0052 320/107 |
| 9,419,472 B2* | 8/2016 | Sells | H02J 7/35 |
| 2010/0207571 A1 | 8/2010 | English et al. | |
| 2010/0219790 A1* | 9/2010 | Chadbourne | G06F 1/266 320/107 |
| 2011/0006727 A1 | 1/2011 | Blau et al. | |
| 2012/0187897 A1 | 7/2012 | Lenk et al. | |
| 2016/0134157 A1* | 5/2016 | Maeno | H02J 7/007 320/101 |

* cited by examiner

*Primary Examiner* — Ryan Johnson
(74) *Attorney, Agent, or Firm* — Mintz Levin Cohn Ferris Glovsky and Popeo, P.C.

(57) ABSTRACT

In some example embodiments, there may be provided a method, which may include determining, by controller circuitry, whether an energy source provides at least a threshold current; connecting, when the energy source provides at least the threshold current, the energy source to interface circuitry to enable a normal mode of operation at the user equipment; and connecting, when the energy source does not provide at least the threshold current, the energy source to the battery. Related system, methods, and articles of manufacture are also disclosed.

17 Claims, 4 Drawing Sheets

USB ENERGY HARVESTING

FIELD

The subject matter described herein relates to energy harvesting.

BACKGROUND

Physical connectors, such as the connector used with the Universal Serial Bus (USB), can be used to couple devices. USB standards may be used to define physical and electrical aspects of USB. Examples of those standards include the Universal Serial Bus 3.1 Specification and Universal Serial Bus 2.0 and 3.0 Specifications, as well as any additions, revisions, and updates thereto. USB also defines specific connectors, such as the USB Type-C connector which has emerged as a USB-type connector having a relatively small size, when compared to the USB Type-A (also referred to as Standard A) and Type-B (also referred to micro-B).

SUMMARY

Methods and apparatus, including computer program products, are provided for energy harvesting.

In some example embodiments, there may be provided a method, which may include determining, by controller circuitry, whether an energy source provides at least a threshold current; connecting, when the energy source provides at least the threshold current, the energy source to interface circuitry to enable a normal mode of operation at the user equipment; and connecting, when the energy source does not provide at least the threshold current, the energy source to the battery.

In some variations, one or more of the features disclosed herein including the following features can optionally be included in any feasible combination. The energy source may be coupled to a charging port at the user equipment. The energy source may be coupled to the charging port via a universal serial bus dedicated charging port. The controller circuitry may detect a type of the energy source. The threshold current may be determined based on the detected type of the energy source. The connecting the energy source to the battery may further include connecting the energy source directly to the battery of the user equipment. The direct connection may include one or more components. The connecting the energy source to the battery may further include triggering, by the controller circuitry based on the determining, a switch to couple the energy source coupled to a charging port to the battery of the user equipment. The connecting the energy source to the interface circuitry may further include triggering, by the controller circuitry based on the determining, the switch to couple the energy source to the interface circuitry. The interface circuitry may include universal serial bus circuitry. The connection to the interface circuitry may be switched to the battery, when at least the current of the energy source goes below the threshold current.

The above-noted aspects and features may be implemented in systems, apparatus, methods, and/or articles depending on the desired configuration. The details of one or more variations of the subject matter described herein are set forth in the accompanying drawings and the description below. Features and advantages of the subject matter described herein will be apparent from the description and drawings, and from the claims.

Like labels are used to refer to same or similar items in the drawings.

DETAILED DESCRIPTION

User equipment, such as a cell phone, a smart phone, and/or any other device or accessory, may harvest energy via a connector, such as a Universal Serial Bus (USB) connector. This energy harvesting may be from an energy source, such as an alternative energy source (for example, a solar cell, a quick charge battery-based power source, and the like) via a port, such as a charging port, charging connector, and/or a dedicated charging port (DCP) as may be used by for example USB chargers. The USB specifications may, however, require that a device coupled via a port, such as the DCP, must provide a specified amount of current. For example, the USB specification may require the any energy source at the DCP provide for example a minimum of about 500 milliamps at voltages below 4.75 Volts (to enable for example certain operations, such as boot-up, lighting a charging indicator, and the like at a device) and provide up to about 1.5 Amps. This minimum current threshold may prevent harvesting energy from some energy sources, such as alternative energy sources (for example, solar cells and other energy sources that may at times provide less than 500 milliamps).

In some example embodiments, the subject matter disclosed herein may provide energy harvesting controller circuitry that detects the current being provided by a source. If that current from the energy source is below a threshold current as might be the case with certain solar cells and other alternative energy sources, the energy harvesting controller circuitry harvests energy by coupling that energy source directly to the user equipment's battery and by inhibiting normal USB operations, such as USB communications, boot-up, direct current to direct current charging, and the like.

Figure 1:
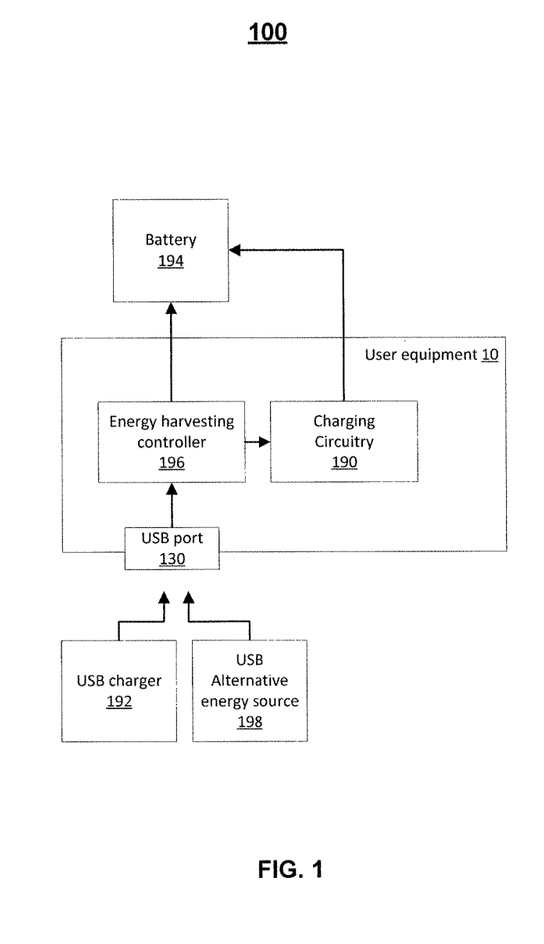
FIG. 1 depicts an example of a system including an energy harvesting controller, in accordance with some example embodiments.

FIG. 1 depicts a system 100 including energy sources, such as a battery 194, a USB charger 192, and an alternative energy source 198. These energy sources may couple to a user equipment (UE) 10, although the energy sources may couple to any other device or accessory as well. Moreover, this coupling may be from a USB DCP, which may be a micro-USB (Type-B connector), although other types of USB connectors, port types, and connector types may be used as well.

In some example embodiments, user equipment (UE) 10 may include energy harvesting control circuitry 196 (also referred to herein as controller). The controller circuitry 196 may implemented as part of the UE 10 power management circuitry, USB circuitry, and/or at other locations as well.

Although some of the examples described herein refer to USB and certain values for threshold currents, these are merely examples as interfaces other than USB and other threshold current and/or voltage values may be used as well.

In some example embodiments, controller 196 may detect whether an energy source coupled to a charging port, such as a USB port 130, can provide a threshold current, such as 500 milliamps, although other thresholds may be used as well. If the coupled energy source provides less than the threshold current, controller 196 may couple (or maintain) a direct connection between the coupled energy source and the battery 194 to enable energy harvesting. On the other hand, if the energy source is providing more than the threshold current, the controller 196 may allow the energy source to couple to USB circuitry to allow normal operations, such as boot-up, charging via a USB charger 192, and/or other operations.

In some example embodiments, controller 196 may detect whether an energy source coupled to the USB port 130 can provide a voltage and a current within an operating range specified for a USB charger 192. For example, a USB charger 192 may be configured to operate within certain area of a voltage-current operating region. User equipment 10 (for example controller 196) may measure the voltage and/or current provided by an energy source coupled to USB port 130. If the energy source coupled to USB port 130 is not able to provide a voltage and/or current that are within the operating range defined or specified for the USB charger 192, it may not be possible to charge battery 194 via the charging circuitry 190. For example, charging circuitry 190 may be configured to prevent charging, when the input charging current and/or voltage are lower than a current and/or voltage threshold and/or are outside the operating range defined/specified for USB charger 192. If the voltage and/or the current provided by an energy source coupled to USB port are not within this predetermined operating range, controller 196 may couple the USB port directly to battery 194, in accordance with some example embodiments.

To illustrate further, the energy source may be an alternative energy source 198, such as a solar cell, a bicycle dynamo (for example, after rectification), a wind generator, a hand-operated crank generator, a thermo element, a fuel cell, a primary battery, a vibration energy harvester, and the like. In this example, alternative energy source 198 coupled to a USB port 130 at UE 10 including controller 196 may not be able to provide more than 500 milliamps. As such, controller 196 may couple the alternative energy source 198 directly to the battery 194 in order to fully harvest the energy from the alternative energy source 198. In this context, a "direct" connection from controller 196 to battery 194 may include coupling controller 196 to battery 194 via one or more components, such as one or more electrical leads, one or more resistors, one or more capacitors, and/or one or more inductors. The direct connection between controller 196 and battery 194 may, for example, include protection circuitry to prevent instantaneous power peaks from causing damage to battery 194. The direct connection may also include any alternative electrical path to the battery 194, such as coupling the USB 130 port to battery 194 via charging circuitry 190 of the UE 10. An example of an non-direct connection would be to connect controller 196 to battery via the charging circuitry 190 that is configured to control the charging operation (for example, initiating and terminating charging of battery 194). However, if the energy source is capable of providing at least the 500 milliamps, then controller 196 may enable normal USB operations at the UE 10, in which case the UE may allow the UE 10 to for example enable boot-up while charging, activate an application, start actively display for example an icon, such as a charging icon or animation, light up a charging LED, start more active operation including disabling one or more power saving features and enabling power consuming features (for example, scanning available connectivity), and the like.

These normal USB operations may include controller 196 directing power received from USB port 130 to the charging circuitry 190. Charging circuitry 190 may for example comprise a DC-DC converter to control the charging voltage and/or the charging current when charging battery 194. To illustrate further, if the energy source is a USB charger 192 or a battery-based USB quick charger (which is fully charged and is capable of delivering the threshold current), controller 196 may enable normal USB operations at UE 10. As such, controller 196 may, in some example embodiments, allow harvesting from energy sources that do not meet the required minimum current requirements, such as the 500 milliamp requirement required by for example the USB specifications.

Figure 2:
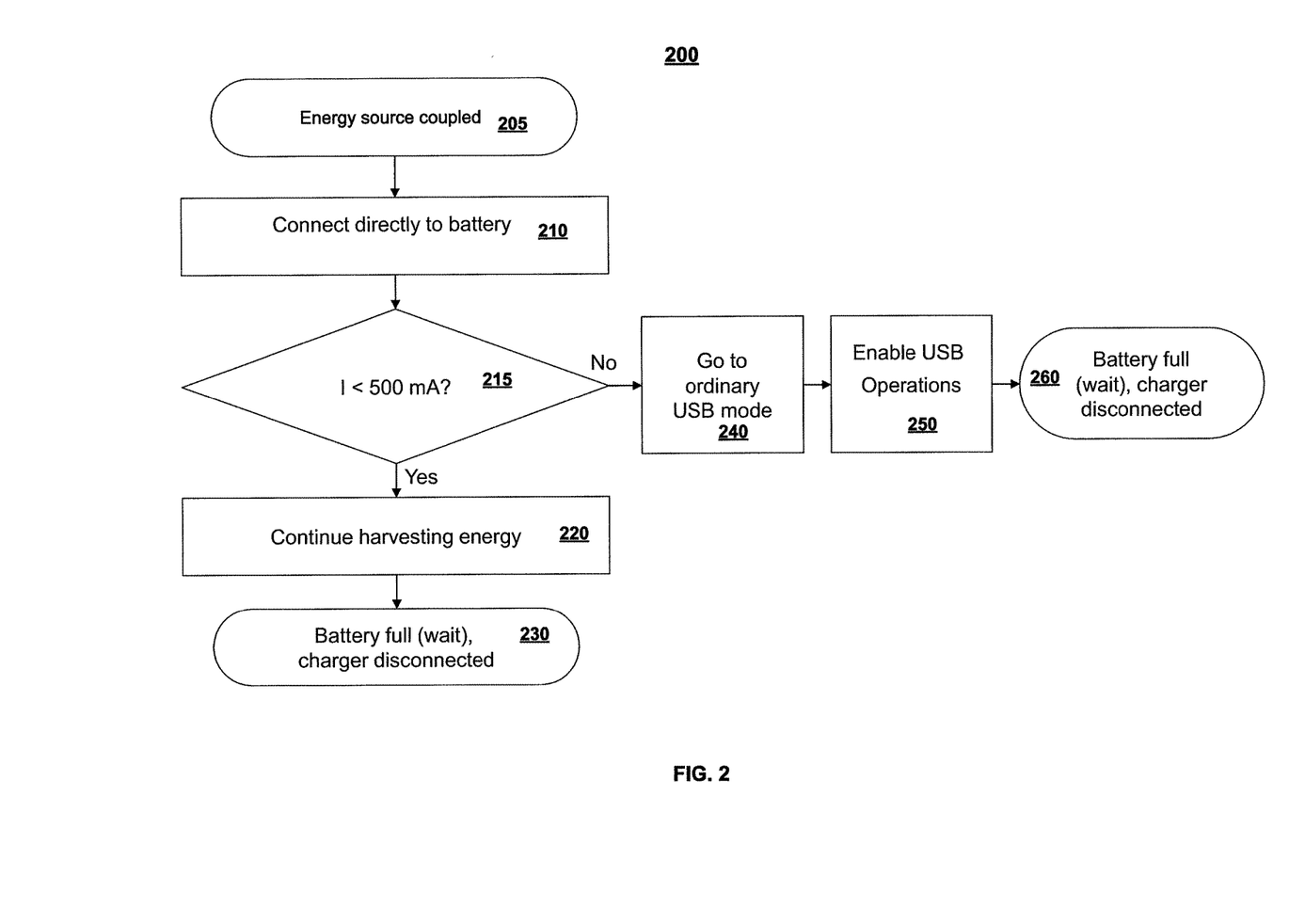
FIG. 2 depicts an example of a process for energy harvesting, in accordance with some example embodiments.

FIG. 2 depicts an example process 200 for energy harvesting, in accordance with some example embodiments. The description of FIG. 2 also refers to FIG. 1.

When a power source is connected to UE 10, controller 196 may, at 206, detect the connected energy source, in accordance with some example embodiments. As noted, some energy sources coupled to for example USB port 130 at UE 10 may not be able to provide at any given time a threshold current value, such as 500 milliamps. For example, a solar charger coupled via a USB port 130 to UE 10 may not be able to supply the threshold current, but a USB charger accessory 192 may be able to supply the threshold current. In some example embodiments, controller 196 may detect a type of the coupled energy source to determine the threshold current value and/or an operating range. For example, controller 196 may determine that an energy source represents itself as a DCP. Based on the detected type of the energy source, the controller may determine the current threshold and/or the operating range. Detecting the type of the energy source may be implemented according to USB specifications, as well as in other ways, too.

At 210, controller 196 may couple the coupled energy source/alternative energy source 198 directly to battery 194 to enable energy harvesting, in accordance with some example embodiments. However, if the current being supplied by the coupled energy source is less than the threshold current, controller 196 may maintain (or connect) the direct connection between the couple energy source and the battery (yes at 215 and 220) in accordance with some example embodiments. For example, when the coupled energy source is coupled to the battery 194, controller 196 may measure (or receive) a current measurement. If this current measurement is less than the threshold current (which in this example is 500 milliamps), controller 196 may maintain the direct connection to the battery, while inhibiting certain USB operations, such as boot-up and the like. In this way, an alternative energy source is fully harvested by the battery 194.

If the current being supplied by the coupled energy source is at or above the threshold current, controller 196 may enter into a so-called "normal" USB mode at 240. When in the normal mode, UE 10 may perform operations, at 250, such as enable boot-up while charging UE 10, allow direct current to direct current conversion, and the like. Controller 196 may continue, at 260, in this normal mode until there is a disconnection of the energy source, the battery 194 is full, and the like.

Figure 3:
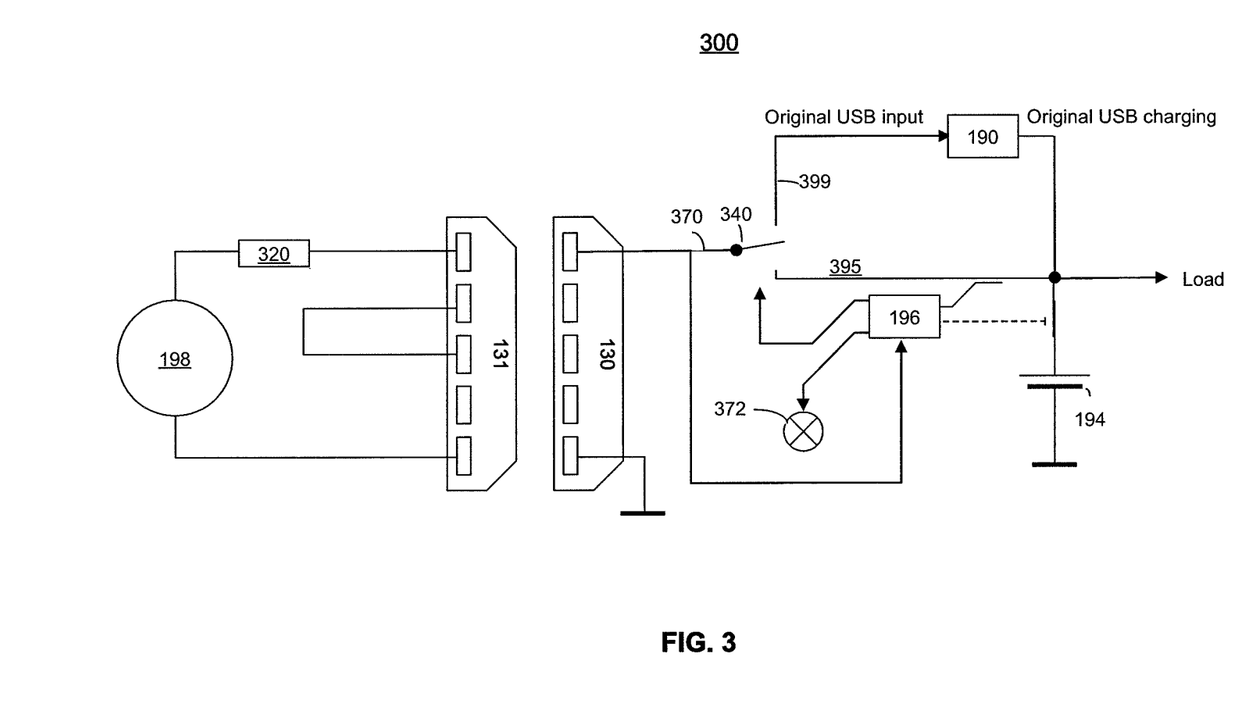
FIG. 3 depicts another example of a system including an energy harvesting controller, in accordance with some example embodiments.

FIG. 3 depicts an example system 300, in accordance with some example embodiments. The description of FIG. 3 also refers to FIGS. 1 and 2.

The system 300 may include alternative energy source 198 coupled via a dedicated charging port 131. The alternative energy source 198 may have a resistive (current limited) output 320. In the example of FIG. 3, DCP 131 may be implemented as a micro-B USB connector, and USB port 130 as micro-B USB receptacle, although other types of connectors (including connectors other than USB) may be used as well.

In some example embodiments, system 300 may include controller 196. When controller 196 detects a current at 370 from the coupled energy source at or above a threshold current, controller 196 may activate switch 340 to couple 370 to 399 to enable normal USB operation at for example 240. However, when controller 196 detects a current at 370 from the coupled energy source below a threshold current, controller 196 may activate switch 340 to couple 370 to 395 to directly couple (or maintain the coupling of) the energy source to a load, such as battery 194, while inhibiting some USB operations which be initiated by for example the USB circuitry.

In some example embodiments, controller 196 may maintain switch 340 so that line 370 is coupled to 395 and the load, such as the battery 194, until controller 196 can detect the current at 370. If the current from the coupled power source is less than the threshold current (as might be the case with a solar cell at 198), controller 196 may maintain the switch so that line 370 is coupled to 395 and for example battery 194. However, if the current from the coupled power source is at or above the threshold current, controller 196 may move the switch 340 so that line 370 is coupled to 399 and the normal USB circuitry to enable normal USB operations.

System 300 also depicts a low power indicator 372, such as a light emitting diode or electric ink indicator to signal that energy harvesting mode at less than a threshold current is taking place. System 300 also depicts a USB charger connection that can be coupled directly to battery 194.

In some example embodiments, controller 196 and the associated energy harvesting mode disclosed herein may enable all of the power savings modes of for example a UE. For example, the UE's stand by and sleep modes may remain intact (at for example 240) with the same activity periods being used as without a power supply in order to gain some extension to stand by and sleep times even with very low harvesting power. If device is in power off mode and the battery is flat or partially charged, the UE may not wake up until the USB energy harvester has charged the battery to a sufficient level for waking up the UE. After the battery level is sufficient, the UE may act as if a normal USB power supply were connected.

In some example embodiments, micro power charge control may be implemented. Controller 196 may be implemented in CMOS, so as to provide negligible power consumption itself In some example embodiments, there may be provided a constant current mode up to USB charger level 500 milliamps (or other current level, such as a lower 100 mA, for other USB devices or a higher current level in order to for example gain efficiency with a low power charger that only can supply close to 500 mA). Below the set USB energy harvesting threshold current level (which in some cases is 500 milliamps), the controller 196 may monitor the charge level of the battery and the harvesting current independently. When the current exceeds the threshold current level, controller 196 may connect the USB charger to a standard USB input to allow the device to act according traditional USB charging procedures. When current goes below 500 mA, the UE/device may disconnect the charger and go to standby mode allowing the controller 196 to reactivate. In practice majority of devices currently accepts lower than specified current and continue charging though the efficiency is very poor. For example, if the device itself consumes 300 mA in active mode, neglects the low limit of said 500 mA specification, and a charger only supplies 400 mA, it will take long time to charge the device in a conventional way with 100 mA net charging current. However, with energy harvesting mode and device in sleep or power off state, the charging with all available 400 mA may, in some implementations, be faster. Furthermore, assuming a device consumes 300 mA in active mode with external power supply, though let us say only 100 mA in portable mode, and neglects the low limit of said 500 mA specification, and the charger only supplies this time 200 mA, then connecting such power source will not lead the device to be charged, but continue a reduction in its battery. However, with energy harvesting mode, the device may not be suffer a reduction in its battery but slowly charge it.

Figure 4:
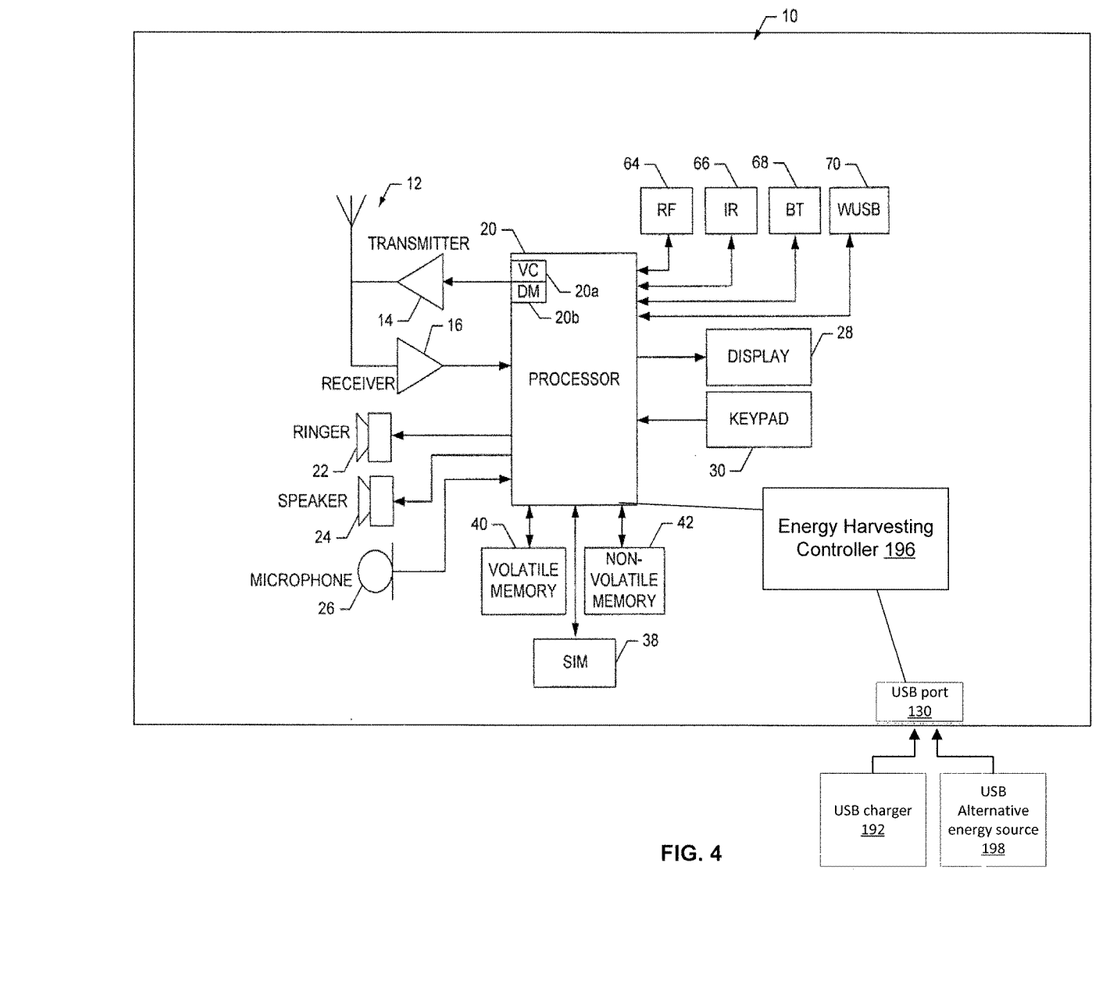
FIG. 4 depicts an example of a user equipment, in accordance with some example embodiments.

FIG. 4 illustrates a block diagram of an apparatus 10, in accordance with some example embodiments. For example, apparatus 10 may be implemented as a user equipment, such as a smart phone, a source of audio (for example, a microphone and the like), a sink of audio (for example, a speaker), a microphone, a headset, a digital headset, a television, a tablet, and/or any other device or accessory.

In some example embodiments, apparatus 10 may include controller 196 coupled to port 130, where an energy source, such as sources 192 and 198, can couple.

The apparatus 10 may, in some example embodiments, include at least one antenna 12 in communication with a transmitter 14 and a receiver 16. Alternatively transmit and receive antennas may be separate.

The apparatus 10 may, in some example embodiments, also include a processor 20 configured to provide signals to and receive signals from the transmitter and receiver, respectively, and to control the functioning of the apparatus. Processor 20 may be configured to control the functioning of the transmitter and receiver by effecting control signaling via electrical leads to the transmitter and receiver. Likewise, processor 20 may be configured to control other elements of apparatus 10 by effecting control signaling via electrical leads connecting processor 20 to the other elements, such as a display or a memory. The processor 20 may, for example, be embodied in a variety of ways including circuitry, at least one processing core, one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits (for example, an application specific integrated circuit (ASIC), a field programmable gate array (FPGA), and/or the like), or some combination thereof. Accordingly, although illustrated in FIG. 4 as a single processor, in some example embodiments the processor 20 may comprise a plurality of processors or processing cores.

Signals sent and received by the processor 20 may include signaling information in accordance with an air interface standard of an applicable cellular system, and/or any number of different wireline or wireless networking techniques, comprising but not limited to Wi-Fi, wireless local access network (WLAN) techniques, such as Institute of Electrical and Electronics Engineers (IEEE) 802.11, 802.16, and/or the like. In addition, these signals may include speech data, user generated data, user requested data, and/or the like.

The apparatus 10 may be capable of operating with one or more air interface standards, communication protocols, modulation types, access types, and/or the like. For example, the apparatus 10 and/or a cellular modem therein may be capable of operating in accordance with various first generation (1G) communication protocols, second generation (2G or 2.5G) communication protocols, third-generation (3G) communication protocols, fourth-generation (4G) communication protocols, Internet Protocol Multimedia Subsystem (IMS) communication protocols (for example, session initiation protocol (SIP) and/or the like. For example, the apparatus 10 may be capable of operating in accordance with 2G wireless communication protocols IS-136, Time Division Multiple Access TDMA, Global System for Mobile communications, GSM, IS-95, Code Division Multiple Access, CDMA, and/or the like. In addition, for example, the apparatus 10 may be capable of operating in accordance with 2.5G wireless communication protocols General Packet Radio Service (GPRS), Enhanced Data GSM Environment (EDGE), and/or the like. Further, for example, the apparatus 10 may be capable of operating in accordance with 3G wireless communication protocols, such as Universal Mobile Telecommunications System (UMTS), Code Division Multiple Access 2000 (CDMA2000), Wideband Code Division Multiple Access (WCDMA), Time Division-Synchronous Code Division Multiple Access (TD-SCDMA), and/or the like. The apparatus 10 may be additionally capable of operating in accordance with 3.9G wireless communication protocols, such as Long Term Evolution (LTE), Evolved Universal Terrestrial Radio Access Network (E-UTRAN), and/or the like. Additionally, for example, the apparatus 10 may be capable of operating in accordance with 4G wireless communication protocols, such as LTE Advanced and/or the like as well as similar wireless communication protocols that may be subsequently developed.

It is understood that the processor 20 may include circuitry for implementing audio/video and logic functions of apparatus 10. For example, the processor 20 may comprise a digital signal processor device, a microprocessor device, an analog-to-digital converter, a digital-to-analog converter, and/or the like. Control and signal processing functions of the apparatus 10 may be allocated between these devices according to their respective capabilities. The processor 20 may additionally comprise an internal voice coder (VC) 20a, an internal data modem (DM) 20b, and/or the like. Further, the processor 20 may include functionality to operate one or more software programs, which may be stored in memory. In general, processor 20 and stored software instructions may be configured to cause apparatus 10 to perform actions. For example, processor 20 may be capable of operating a connectivity program, such as a web browser. The connectivity program may allow the apparatus 10 to transmit and receive web content, such as location-based content, according to a protocol, such as wireless application protocol, WAP, hypertext transfer protocol, HTTP, and/or the like.

Apparatus 10 may also comprise a user interface including, for example, an earphone or speaker 24, a ringer 22, a microphone 26, a display 28, a user input interface, and/or the like, which may be operationally coupled to the processor 20. The display 28 may, as noted above, include a touch sensitive display, where a user may touch and/or gesture to make selections, enter values, and/or the like. The processor 20 may also include user interface circuitry configured to control at least some functions of one or more elements of the user interface, such as the speaker 24, the ringer 22, the microphone 26, the display 28, and/or the like. The processor 20 and/or user interface circuitry comprising the processor 20 may be configured to control one or more functions of one or more elements of the user interface through computer program instructions, for example, software and/or firmware, stored on a memory accessible to the processor 20, for example, volatile memory 40, non-volatile memory 42, and/or the like. The apparatus 10 may include a battery for powering various circuits related to the mobile terminal, for example, a circuit to provide mechanical vibration as a detectable output. The user input interface may comprise devices allowing the apparatus 20 to receive data, such as a keypad 30 (which can be a virtual keyboard presented on display 28 or an externally coupled keyboard) and/or other input devices.

As shown in FIG. 4, apparatus 10 may also include one or more mechanisms for sharing and/or obtaining data. For example, the apparatus 10 may include a short-range radio frequency (RF) transceiver and/or interrogator 64, so data may be shared with and/or obtained from electronic devices in accordance with RF techniques. The apparatus 10 may include other short-range transceivers, such as an infrared (IR) transceiver 66, a Bluetooth™ (BT) transceiver 68 operating using Bluetooth™ wireless technology, a wireless universal serial bus (USB) transceiver 70, a Bluetooth™ Low Energy transceiver, a ZigBee transceiver, an ANT transceiver, a cellular device-to-device transceiver, a wireless local area link transceiver, and/or any other short-range radio technology. Apparatus 10 and, in particular, the short-range transceiver may be capable of transmitting data to and/or receiving data from electronic devices within the proximity of the apparatus, such as within 10 meters, for example. The apparatus 10 including the Wi-Fi or wireless local area networking modem may also be capable of transmitting and/or receiving data from electronic devices according to various wireless networking techniques, including 6LoWpan, Wi-Fi, Wi-Fi low power, WLAN techniques such as IEEE 802.11 techniques, IEEE 802.15 techniques, IEEE 802.16 techniques, and/or the like.

The apparatus 10 may comprise memory, such as a subscriber identity module (SIM) 38, a removable user identity module (R-UIM), a eUICC, an UICC, and/or the like, which may store information elements related to a mobile subscriber. In addition to the SIM, the apparatus 10 may include other removable and/or fixed memory. The apparatus 10 may include volatile memory 40 and/or non-volatile memory 42. For example, volatile memory 40 may include Random Access Memory (RAM) including dynamic and/or static RAM, on-chip or off-chip cache memory, and/or the like. Non-volatile memory 42, which may be embedded and/or removable, may include, for example, read-only memory, flash memory, magnetic storage devices, for example, hard disks, floppy disk drives, magnetic tape, optical disc drives and/or media, non-volatile random access memory (NVRAM), and/or the like. Like volatile memory 40, non-volatile memory 42 may include a cache area for temporary storage of data. At least part of the volatile and/or non-volatile memory may be embedded in processor 20. The memories may store one or more software programs, instructions, pieces of information, data, and/or the like which may be used by the apparatus to perform one or more of the operations disclosed herein with respect to the controller circuitry, UE, and/or the like. The memories may comprise an identifier, such as an international mobile equipment identification (IMEI) code, capable of uniquely identifying apparatus 10. The functions may include one or more of the operations disclosed with respect to process 200. The memories may comprise an identifier, such as an international mobile equipment identification (IMEI) code, capable of uniquely identifying apparatus 10. In the example embodiment, the processor 20 may be configured using computer code stored at memory 40 and/or 42 to perform one or more of the operations disclosed herein including process 200.

Some of the embodiments disclosed herein may be implemented in software, hardware, application logic, or a combination of software, hardware, and application logic. The software, application logic, and/or hardware may reside on memory 40, the control apparatus 20, or electronic components, for example. In some example embodiment, the any application logic, software or an instruction set is maintained on any one of various conventional computer-readable media. In the context of this document, a "computer-readable medium" may be any non-transitory media that can contain, store, communicate, propagate or transport the instructions for use by or in connection with an instruction execution system, apparatus, or device, such as a computer or data processor circuitry, with examples depicted at FIG. 4, computer-readable medium may comprise a non-transitory computer-readable storage medium that may be any media that can contain or store the instructions for use by or in connection with an instruction execution system, apparatus, or device, such as a computer.

Without in any way limiting the scope, interpretation, or application of the claims appearing below, a technical effect of one or more of the example embodiments disclosed herein is enhanced harvesting of alternative energy sources which may at certain times not provide a threshold charging current level.

If desired, the different functions discussed herein may be performed in a different order and/or concurrently with each other. Furthermore, if desired, one or more of the above-described functions may be optional or may be combined. Although various aspects of some of the embodiments are set out in the independent claims, other aspects of some of the embodiments may comprise other combinations of features from the described embodiments and/or the dependent claims with the features of the independent claims, and not solely the combinations explicitly set out in the claims. It is also noted herein that while the above describes example embodiments, these descriptions should not be viewed in a limiting sense. Rather, there are several variations and modifications that may be made without departing from the scope of the some of the embodiments as defined in the appended claims. Other embodiments may be within the scope of the following claims. The term "based on" includes "based on at least." The use of the phase "such as" means "such as for example" unless otherwise indicated.

What is claimed:

1. A method comprising:
    determining, by controller circuitry, whether an energy source provides at least a threshold current;
    detecting, by the controller circuitry, a type of the energy source;
    determining the threshold current based on the detected type of the energy source;
    connecting, when the energy source provides at least the threshold current, the energy source to interface circuitry to enable a normal mode of operation at a user equipment; and
    connecting, when the energy source does not provide at least the threshold current, the energy source to a battery.

2. The method of claim 1, wherein the energy source is coupled to a charging port at the user equipment.

3. The method of claim 2, wherein the energy source is coupled to the charging port via a universal serial bus dedicated charging port.

4. The method of claim 1, wherein the connecting the energy source to the battery further comprises:
    connecting the energy source directly to the battery of the user equipment.

5. The method of claim 4, wherein the direct connection includes one or more components.

6. The method of claim 1, wherein the connecting the energy source to the battery further comprises:
    triggering, by the controller circuitry based on the determining, a switch to couple the energy source coupled to a charging port to the battery of the user equipment.

7. The method of claim 1, wherein the connecting the energy source to the interface circuitry further comprises:
    triggering, by the controller circuitry based on the determining, a switch to couple the energy source to the interface circuitry.

8. The method of claim 1, wherein the interface circuitry comprises universal serial bus circuitry.

9. A method comprising:
    determining, by controller circuitry, whether an energy source provides at least a threshold current;
    connecting, when the energy source provides at least the threshold current, the energy source to interface circuitry to enable a normal mode of operation at a user equipment; and
    connecting, when the energy source does not provide at least the threshold current, the energy source to a battery
    wherein the connection to the interface circuitry is switched to the battery, when at least the current of the energy source goes below the threshold current.

10. An apparatus comprising:
    at least one processor; and
    at least one memory including computer program code, the at least one memory and the computer program code configured to, with the at least one processor, cause the apparatus to perform at least the following:
        determine whether an energy source provides at least a threshold current;
        detect, by the apparatus including controller circuitry, a type of the energy source;
        determine the threshold current based on the detected type of the energy source;
        connect, when the energy source provides at least the threshold current, the energy source to interface circuitry to enable a normal mode of operation at the apparatus; and
        connect, when the energy source does not provide at least the threshold current, the energy source to a battery.

11. The apparatus of claim 10, wherein the energy source is coupled to a charging port at the apparatus.

12. The apparatus of claim 11, wherein the energy source is coupled to the charging port via a universal serial bus dedicated charging port.

13. The apparatus of claim 10, wherein the connecting the energy source to the battery further comprises the apparatus being configured to at least:
    connect the energy source directly to the battery of the apparatus.

14. The apparatus of claim 13, wherein the direct connection includes one or more components.

15. The apparatus of claim 10, wherein the connecting the energy source to the battery further comprises the apparatus being configured to at least:
trigger, based on the determining, a switch to couple the energy source coupled to a charging port to the battery of the apparatus.

16. A non-transitory computer-readable storage medium including program code which when executed by at least one processor causes operations comprising:
determining, by controller circuitry, whether an energy source provides at least a threshold current;
detecting, by the controller circuitry, a type of the energy source;
determining the threshold current based on the detected type of the energy source;
connecting, when the energy source provides at least the threshold current, the energy source to interface circuitry to enable a normal mode of operation at a user equipment; and
connecting, when the energy source does not provide at least the threshold current, the energy source to a battery.

17. An apparatus comprising:
at least one processor; and
at least one memory including computer program code, the at least one memory and the computer program code configured to, with the at least one processor, cause the apparatus to perform at least the following:
determine, by controller circuitry, whether an energy source provides at least a threshold current;
connect, when the energy source provides at least the threshold current, the energy source to interface circuitry to enable a normal mode of operation at a user equipment; and
connect, when the energy source does not provide at least the threshold current, the energy source to a battery, wherein the connection to the interface circuitry is switched to the battery, when at least the current of the energy source goes below the threshold current.

* * * * *